United States Patent
Ozzie et al.

(10) Patent No.: US 8,020,112 B2
(45) Date of Patent: Sep. 13, 2011

(54) CLIPBOARD AUGMENTATION

(75) Inventors: Raymond E. Ozzie, Seattle, WA (US); Jack E. Ozzie, North Bend, WA (US); George P. Moromisato, Seattle, WA (US); Paresh S. Suthar, Redmond, WA (US); Raman Narayanan, Kirkland, WA (US); Matthew S. Augustine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 11/557,004

(22) Filed: Nov. 6, 2006

(65) Prior Publication Data

US 2008/0109744 A1    May 8, 2008

(51) Int. Cl.
*G06F 3/048* (2006.01)
(52) U.S. Cl. .................. 715/770; 715/764; 715/765
(58) Field of Classification Search .............. 715/770, 715/764, 765
See application file for complete search history.

(56) References Cited

U.S. PATENT DOCUMENTS

| | | | |
|---|---|---|---|
| 5,261,080 A | 11/1993 | Khoyi et al. | |
| 5,392,386 A | 2/1995 | Chalas | |
| 5,442,742 A * | 8/1995 | Greyson et al. | 715/210 |
| 5,579,521 A | 11/1996 | Shearer et al. | |
| 5,625,809 A | 4/1997 | Dysart et al. | |
| 5,752,254 A | 5/1998 | Sakairi | |
| 5,781,908 A | 7/1998 | Williams et al. | |
| 5,899,996 A | 5/1999 | Dysart et al. | |
| 5,924,099 A | 7/1999 | Guzak et al. | |
| 5,926,633 A | 7/1999 | Takagi et al. | |
| 5,964,834 A | 10/1999 | Crutcher | |
| 5,974,238 A | 10/1999 | Chase, Jr. | |
| 6,091,731 A | 7/2000 | Biegaj et al. | |
| 6,202,100 B1 | 3/2001 | Maltby et al. | |
| 6,295,541 B1 | 9/2001 | Bodnar et al. | |
| 6,338,084 B1 | 1/2002 | Rankin et al. | |
| 6,401,104 B1 | 6/2002 | LaRue et al. | |
| 6,460,089 B1 | 10/2002 | Romano et al. | |
| 6,490,634 B2 | 12/2002 | Coiner | |
| 6,532,474 B2 | 3/2003 | Iwamoto et al. | |
| 6,549,922 B1 | 4/2003 | Srivastava et al. | |
| 6,553,037 B1 | 4/2003 | Pivowar et al. | |
| 6,591,295 B1 | 7/2003 | Diamond et al. | |
| 6,675,213 B1 | 1/2004 | Schmonsees | |
| 6,721,951 B1 | 4/2004 | Williams et al. | |
| 6,760,728 B1 | 7/2004 | Osborn | |
| 6,912,690 B2 | 6/2005 | Bauchot | |
| 6,983,328 B2 | 1/2006 | Beged-Dov et al. | |

(Continued)

FOREIGN PATENT DOCUMENTS

EP    0597575 B1    12/1999

(Continued)

OTHER PUBLICATIONS

Bill Burcham, Baby Steps to Synergistic Web App; http://lesscode.org/2005/10/21/baby-steps-to-synergistic-web-apps/; Oct. 21, 2005.

(Continued)

*Primary Examiner* — Weilun Lo
*Assistant Examiner* — Shashi K Becker

(57) ABSTRACT

Systems, methods, and data structures for augmenting data placed on the clipboard with additional data are disclosed. Such systems, methods, and data structures may transform the data to produce data in other formats using, for example, transform specifications or executable code.

16 Claims, 5 Drawing Sheets

U.S. PATENT DOCUMENTS

| | | | |
|---|---|---|---|
| 6,986,105 B2 | 1/2006 | Walker, Jr. | |
| 6,993,522 B2 | 1/2006 | Chen et al. | |
| 7,003,546 B1 | 2/2006 | Cheah | |
| 7,007,041 B2 | 2/2006 | Multer | |
| 7,013,316 B1 | 3/2006 | Hansen et al. | |
| 7,130,924 B2 | 10/2006 | Bartlett et al. | |
| 7,146,571 B2 | 12/2006 | Bates et al. | |
| 7,207,008 B1 | 4/2007 | Koch | |
| 7,260,610 B2 | 8/2007 | Grooters | |
| 7,421,155 B2* | 9/2008 | King et al. | 382/312 |
| 7,496,230 B2* | 2/2009 | Chen et al. | 382/182 |
| 2002/0007380 A1 | 1/2002 | Bauchot et al. | |
| 2002/0073204 A1 | 6/2002 | Dutta et al. | |
| 2002/0122054 A1 | 9/2002 | Hind et al. | |
| 2002/0133508 A1 | 9/2002 | LaRue et al. | |
| 2002/0138653 A1 | 9/2002 | Ogura | |
| 2003/0009602 A1 | 1/2003 | Jacobs | |
| 2003/0105831 A1 | 6/2003 | O'Kane | |
| 2003/0115301 A1 | 6/2003 | Koskimies | |
| 2003/0142134 A1 | 7/2003 | Bates et al. | |
| 2003/0220966 A1 | 11/2003 | Hepper | |
| 2004/0103167 A1 | 5/2004 | Grooters et al. | |
| 2004/0153974 A1 | 8/2004 | Walker | |
| 2004/0172423 A1 | 9/2004 | Kaasten et al. | |
| 2004/0172584 A1* | 9/2004 | Jones et al. | 715/500 |
| 2004/0205470 A1 | 10/2004 | Jones et al. | |
| 2004/0210846 A1 | 10/2004 | Olsen | |
| 2004/0226012 A1 | 11/2004 | Awada et al. | |
| 2004/0250215 A1 | 12/2004 | Chen et al. | |
| 2005/0038811 A1 | 2/2005 | Pivowar et al. | |
| 2005/0050054 A1 | 3/2005 | Clark et al. | |
| 2005/0066335 A1 | 3/2005 | Aarts | |
| 2005/0091603 A1 | 4/2005 | Chen et al. | |
| 2005/0102629 A1 | 5/2005 | Chen et al. | |
| 2005/0117606 A1 | 6/2005 | Kim | |
| 2005/0138122 A1 | 6/2005 | Boehringer et al. | |
| 2005/0155017 A1 | 7/2005 | Berstis et al. | |
| 2005/0165615 A1 | 7/2005 | Minar | |
| 2005/0172296 A1 | 8/2005 | Schleifer et al. | |
| 2005/0182792 A1 | 8/2005 | Israel et al. | |
| 2005/0198299 A1 | 9/2005 | Beck et al. | |
| 2005/0203905 A1 | 9/2005 | Jung et al. | |
| 2005/0203935 A1* | 9/2005 | McArdle | 707/101 |
| 2005/0289265 A1 | 12/2005 | Illowsky et al. | |
| 2006/0004600 A1 | 1/2006 | Summer et al. | |
| 2006/0010204 A1 | 1/2006 | Jalava et al. | |
| 2006/0041893 A1 | 2/2006 | Castro et al. | |
| 2006/0095507 A1 | 5/2006 | Watson | |
| 2006/0106879 A1 | 5/2006 | Zondervan et al. | |
| 2006/0123010 A1 | 6/2006 | Landry et al. | |
| 2006/0129907 A1 | 6/2006 | Volk et al. | |
| 2006/0129917 A1 | 6/2006 | Volk et al. | |
| 2006/0143459 A1 | 6/2006 | Villaron et al. | |
| 2006/0150004 A1 | 7/2006 | Mizutani | |
| 2006/0155821 A1 | 7/2006 | Pichetti et al. | |
| 2006/0173985 A1 | 8/2006 | Moore | |
| 2006/0206807 A1* | 9/2006 | Rosner et al. | 715/515 |
| 2006/0212792 A1 | 9/2006 | White et al. | |
| 2006/0215215 A1 | 9/2006 | Kumaran | |
| 2006/0217126 A1 | 9/2006 | Sohm et al. | |
| 2006/0218492 A1 | 9/2006 | Andrade | |
| 2006/0225137 A1* | 10/2006 | Odins-Lucas et al. | 726/27 |
| 2006/0230021 A1 | 10/2006 | Diab et al. | |
| 2006/0230345 A1 | 10/2006 | Weng et al. | |
| 2006/0242327 A1 | 10/2006 | Knight et al. | |
| 2006/0242549 A1 | 10/2006 | Schwier et al. | |
| 2006/0247961 A1 | 11/2006 | Klemow | |
| 2006/0253489 A1 | 11/2006 | Kahn et al. | |
| 2006/0265396 A1 | 11/2006 | Raman et al. | |
| 2006/0265409 A1 | 11/2006 | Neumann et al. | |
| 2006/0265518 A1 | 11/2006 | Owens et al. | |
| 2006/0282822 A1 | 12/2006 | Weng | |
| 2006/0288329 A1 | 12/2006 | Gandhi et al. | |
| 2007/0022174 A1 | 1/2007 | Issa | |
| 2007/0204308 A1* | 8/2007 | Nicholas et al. | 725/86 |
| 2008/0028442 A1 | 1/2008 | Kaza et al. | |
| 2008/0109464 A1 | 5/2008 | Ozzie et al. | |
| 2008/0109832 A1 | 5/2008 | Ozzie et al. | |
| 2008/0141136 A1 | 6/2008 | Ozzie et al. | |
| 2008/0195739 A1 | 8/2008 | Ozzie et al. | |

FOREIGN PATENT DOCUMENTS

| | | |
|---|---|---|
| WO | WO 0073902 A1 | 12/2000 |
| WO | WO 03030475 A2 | 4/2003 |

OTHER PUBLICATIONS

Clipboard; http://msdn.microsoft.com/library/default.asp?url=/library/en-us/winui/winui/windowsuserinterface/dataexchange/clipboard.asp Copyright 2006 Microsoft Corporation.

Jon Udell; Dueling Simplicities; Nov. 22, 2005: http://weblog.infoworld.com/udell/2005/11/22.html.

Jack Ozzie, et la; Simple Sharing Extensions for RSS and OPML; updated Jan. 12, 2006: http://msdn.microsoft.com/xml/rss/sse/.

MSDN; Frequently Asked Questions for Simple Sharing Extensions (SSE); Copyright 2006 Microsoft Corporation; http://msdn.microsoft.com/xml/rss/ssefaq/.

Bill Burcham, Half a Baby Step; Nov. 2, 2005; http://lesscode.org/2005/11/02/half-a-baby-step/.

Dion Hinchcliffe; How Simple Sharing Extensions Will Change the Web; Dec. 14, 2006 http://web2.wsj2.com/how_simple_sharing_extensions_will_change_the_web.htm.

Live Clipboard—Wiring the Web; http://liveclipboard.org/ ; Dec. 14, 2006.

Live Clipboard Technical Introduction; Dec. 14, 2006 http://spaces.live.com/editorial/rayozzie/demo/liveclip/liveclipsample/techPreview.html.

Live Clipboard Screencasts ; Dec. 14, 2006 http://spaces.live.com/editorial/rayozzie/demo/liveclip/screencast/liveclipdemo.html.

Live Clipboard Example; Dec. 14, 2006 http://spaces.live.com/editorial/rayozzie/demo/liveclip/liveclipsample/clipboardexample.html.

Jack Ozzie, et al, Live Clipboard XML Schema; Updated Apr. 21, 2006 http://spaces.live.com/editorial/rayozzie/demo/liveclip/specification/v092.html.

Dare Obasanjo; Metadata Quality, Events Databases and Live Clipboard; Apr. 3, 2006; http://www.25hoursaday.com/weblog/PermaLink.aspx?guid=91e40df6-c973-4bf7-8eb6-05c778d8cd90.

Microsoft Team RSS Blog; More on SSE; Dec. 7, 2005; http://blogs.msdn.com/rssteam/archive/2005/12/07/501326.aspx.

Bill Burcham; Ray Ozzie Demos Web App Clipboard; Mar. 21, 2006; http://www.memerocket.com/2006/03/21/ray-ozzie-demos-web-app-clipboard/.

Ray Ozzie; Blog; Really Simple Sharing; Nov. 20, 2006 http://rayozzie.spaces.live.com/blog/cns!FB3017FBB9B2E142!175.entry.

Bill Burcham; Ray Ozzie Got the Memo; Mar. 22, 2006; http://lesscode.org/2006/03/22/ray-ozzie-got-the-memo/.

Microsoft Team RSS Blog; Simple Sharing Extensions for RSS and OPML; Dec. 1, 2005; http://blogs.msdn.com/rssteam/archive/2005/12/01/498704.aspx.

Cori Shlegel; Simple Sharing Extensions Up Close; Dec. 14, 2006 http://kinrowan.net/blog/wp/archives/2005/11/23/sse-up-close.

Microsoft Team RSS Blog; SSE Update and Tutorial; Jan. 25, 2006; http://blogs.msdn.com/rssteam/archive/2006/01/25/517473.aspx.

eZINE Approach; Understanding OLE; © 2001 The McGraw-Hill Companies, Inc. All rights reserved .http://www.glencoe.com/ps/computered/pas/article.php4?articleId=149.

Ray Ozzie; Blog; Writing Progress; Apr. 1, 2006 http://rayozzie.spaces.live.com/blog/cns!FB3017FBB9B2E142!377.entry?_c11_blogpart_blogpart=blogview&_c=blogpart.

Ray Ozzie; Blog; Wiring the Web; Mar. 2006 http://rayozzie.spaces.live.com/blog/cns!FB3017FBB9B2E142!285.entry.

Zimbra; A Pint of Ale—Ajax Linking and Embedding; Apr. 3, 2006 http://www.zimbra.com/blog/archives/2006/04/zimbra_ale_ajax_linking_and_embedding.html.

Mark Apperly, et al,; Breaking the Copy/Paste Cycle: The Stretchable Selection Tool; Hamilton, New Zealand http://doi.ieeecomputersociety.org/10.1109/AUIC.2000.822057.

Jeffrey Stylos, et al; Citrine: Providing Intelligent Copy-and-Paste; Pittsburg, PA; Copyright 2004 ACM; Oct. 24-27, 2004; Santa Fe, New Mexico http://www.cs.cmu.edu/~citrine/CitrinePaper.pdf.

Cecile Roisin; Implementing the Cut-and-Paste Operation in a Structured Editing System; Mar. 1994 http://www.oasis-open.org/cover/rois-impl-ps.gz.

Robert C. Miller and Brad A. Myers; Synchronizing Clipboards of Multiple Computers; Copyright 1999 ACM; Asheville, NC http://delivery.acm.org/10.1145/330000/322584/p65-miller.pdf?key1=322584&key2=9349701611&coll=GUIDE&dl=GUIDE&CFID=2357608&CFTOKEN=92034513.

Ken Rimey; "Version Headers for Flexible Synchronization and Conflict Resolution"; Nov. 22, 2004 http://www.hiit.fi/publications/pub_files/hiit-2004-3.pdf.

Leonard Kawell Jr, et al; "Replicated Document Management in a Group Communication System"; Portland, Or., Sep. 26-28, 1998 http://delivery.acm.org/10.1145/1030000/1024798/p395-kawell.pdf?key1=1024798&key2=1402853611&coll=GUIDE&dl=GUIDE&CFID=6163663&CFTOKEN=68289132.

Gabriel Antoniu, et al; "JUXMEM: An Adaptive Supportive Platform for Data Sharing on the Grid"; No. 4917 ; INRIA; Sep. 2003 ftp://ftp.inria.fr/INRIA/tech-reports/publi-pdf/RR/RR-4917.pdf.

David Chmielewski, et al; "A Distributed Platform for Archiving and Retrieving RSS Feeds"; Fourth Annual ACIS International Conference on Computer and Information Science (ICIS 2005); Copyright 2005 IEEE http://ieeexplore.ieee.org/iel5/10154/32462/01515404.pdf?isNumber=.

Jack E. Ozzie, et al; "Simple Sharing Extensions for RSS and OPML"; Version 0.91; Updated Jan. 12, 2006 http://msdn.microsoft.com/xml/rss/sse/.

Mao Yang, et al; "Deployment of a Large-scale Peer-to-Peer Social Network"; Microsoft Research Asia; Beijing, China; last entered on Dec. 14, 2006 http://research.microsoft.com/asia/dload_files/group/system/maze.pdf.

"Attensa Feed Server—Secure, Scalable Web Feed Server"; last entered on Dec. 14, 2006 http://www.attensa.com/products/server/.

"Snarfer"; last entered on Dec. 14, 2006 http://www.snarfware.com/download.htm.

"Ektron CMS200"; Dec. 14, 2006 http://www.ektron.com/manuals/datasheets/EktronCMS200-datasheet.pdf.

"RSSOwl | RSS / RDF / Atom Newsreader"; Feb. 1, 2007 http://www.dirfile.com/rssowl_rdf_atom_newsreader.htm.

"Enterprise RSS the Center of Attention"; last visited on Dec. 14, 2006 http://attensa.typepad.com/attensa/files/attensa_enterprise_rss_whitepaper_0605.pdf.

Heinz Witttenbrink; "RSS and Atom Understanding and Implementing Content Feeds and Syndication"; Dec. 14, 2006 http://www.programmersheaven.com/other/BookSamples/pdf/RSS_SampleChapter.pdf.

Frank Allan Hansen, et al; "RSS as a distribution medium for geospatial hypermedia"; HT '05; Sep. 6-9, 2005; Salzburg, Austria; Copyright 2005 ACM http://portal.acm.org/citation.cfm?id=1083410.

Benoit Marchal; "Working XML: Expand RSS capabilities with RSS extensions"; Aug. 15, 2006 http://www-128.ibm.com/developerworks/xml/library/x-wxxm36.html.

Vadim Zaliva, et al; "Enhanced "enclosures" support in RSS and ATOM Syndication"; Dec. 15, 2004 http://www.crocodile.org/lord/RSSenclosures/RSSenclosures.pdf.

"Live Clipboard Technical Introduction", retrieved from the Internet on Nov. 2, 2006 http://spaces.live.com/editorial/rayozzie/demo/liveclip/liveclipsample/techPreview.html.

Daniel Chudnov et al. "Introducing unAPI", Ariadne Issue 48, Jul. 2006. http://www.ariadne.ac.uk/issue48/chudnov-et-al/.

Microsoft Corporation "Clipboard: Adding Other Formats", MFC Library Reference, ® 2006 Microsoft Corporation, retrieved from Internet on Nov. 16, 2006 http://msdn2.microsoft.com/en-us/library/838a3whf(VS.80).aspx.

Diomidis D. Spinellis "Outwit: Unix Tool-based Programming Meets the Windows World", In Christopher Small, editor, USENIX 2000 Technical Conference Proceedings, pp. 149-158, Berkley, CA, Jun. 2000. USENIX Association. http://www.spinellis.gr/pubs/conf/2000-Usenix-outwit/html/utool.html.

"vCard: The Electronic Business Card", A versit Consortium White Paper, Jan. 1, 1997, Version 2.1. http://www.imc.org/pdi/vcardwhite.html.

Tomi Nummi "The Technical Infrastructure of the LIVE Project" http://www.edu.helsinki.fi/media/mep6/nummi.pdf; Dec. 14, 2006.

Wai-Leung Cheung et al. "Automatic Device Configuration and Data Validation through Mobile Communication", IEEE 2003. http://ieeexplore.ieee.org/iel5/8743/27700/01235773.pdf?isNumber=.

"LiveShare Plus", ® 1997 PictureTel Corporation, http://www.polycom.com/common/pw_cmp_updateDocKeywords/0,1687,573,00.pdf.

Atom Enabled; "What is Atom?", Apr. 5, 2007; http://atomenabled.org.

J. Gregorio, et al; The Atom Publishing Protocol; Mar. 4, 2007; Copyright The IETF Trust 2007; http://www.ietf.org/internet-drafts/draft-ietf-atompub-protocol-14.txt.

Front Page Atom Wiki; "The Atom Project"; Apr. 5, 2007; http://intertwingly.net/wiki/pie/FrontPage.

Dave Winer; "RFC: MetaWeblog API"; Mar. 14, 2002; http://www.xmlrpc.com/metaWeblogApi.

Google Data API's (Beta) Developers Guide: Google Data API's Overview; Apr. 5, 2007; http://code.google.com/apis/gdata/overview.html.

U.S. Appl. No. 11/556,998, which is unpublished.
U.S. Appl. No. 11/539,058, which is unpublished.
U.S. Appl. No. 11/609,717, which is unpublished.

* cited by examiner

CLIPBOARD DATA 410

STRUCTURED DATA 420

STRUCTURED DATA FORMAT 1 430

ITEM 1 434

ITEM N 436

STRUCTURED DATA FORMAT N 432

FEED DATA 450

FEED 1 460

FEED ITEMS 1 464

FEED ITEM 1 466

FEED ITEM N 467

FEED ITEMS N 468

FEED N 462

PRESENTATION DATA 480

PRESENTATION FORMAT 1 490

PRESENTATION FORMAT N 492

CLIPBOARD AUGMENTATION

BACKGROUND

Users of modern operating systems and applications may be accustomed to using a "clipboard" to copy and paste a wide variety of data between different screens and applications. In addition to holding data items, some clipboard systems have the ability to represent or contain multiple formats for a given item. For example, when a user copies, say, a set of cells from a spreadsheet, the spreadsheet application may place those cells on the clipboard in multiple formats. For example, for the copied spreadsheet cells, a clipboard might contain a plain text representation, a formatted text representation (in one or more of a variety of formats), an image representation, an application-specific representation that contains all of the cell information, and so on. When a user pastes the spreadsheet cells into a particular application, the application may request or use a particular format. For example, a text editor may only understand and use the plain text representation, an image editing program may use the image representation, another instance of the same spreadsheet application may use the spreadsheet data, and so on.

While a clipboard system may have the capability of supporting multiple formats for the same item, it is not always the case that a particular format used or required by a destination is included in the format or formats provided by the source of the data. As just one example, a personal information management (PIM) application may have the ability to automatically create a contact, with the appropriate fields already populated, when the user pastes data that the PIM application recognizes as a contact. For example, the PIM application might recognize data formatted using the vCard standard. However, even when a source application has all of the information required to create a contact—the name, address, phone number(s), and so on—it may not know how to format this information in a specific format that may be required by some other application. Continuing this example, if the source provides the contact data in another format—like hCard—then the destination may not recognize the data as a contact and may not automatically create a contact using the pasted data.

As a result, the transfer of data between different applications may be limited to a lower fidelity representation, like strings of text. In this example, even if both a source and destination application understand contact data, if they do not exchange contact data in formats supported by both the source and destination applications then a user may still need to, for example, manually copy individual fields—like name, address, and so on—between applications.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various techniques and technologies directed toward augmenting data placed on a clipboard with additional data, based on the data originally placed on the clipboard. In some cases this augmentation may be performed by transforming the data to produce data in other formats. This may in some implementations be accomplished by using some kind of transform system or executable code. In other cases the augmentation might involve resolving a reference, like a URL or the content of an RSS feed, into data indicated by the reference, and placing such data on the clipboard.

DESCRIPTION OF THE DRAWINGS

FIG. 4 illustrates an exemplary system that includes a graphical example of one mechanism for representing clipboard data, including a transfer representation of data.

DETAILED DESCRIPTION

The present invention extends to various techniques and technologies directed toward the augmentation of data placed on a clipboard with additional data, based on the data originally placed on the clipboard. More particularly, described herein are, among other things, methods, systems, and data structures that facilitate the augmentation of data on a clipboard. In some cases this augmentation may be performed by transforming the data to produce data in other formats. This may in some implementations be accomplished by using some kind of transform system or executable code. For example, data in one format may be transformed or used to produce the same data in one or more other formats. In other cases the augmentation might involve resolving a reference, like a URL or the content of an RSS feed, into data indicated by the reference, and placing such data on the clipboard.

Figure 1:
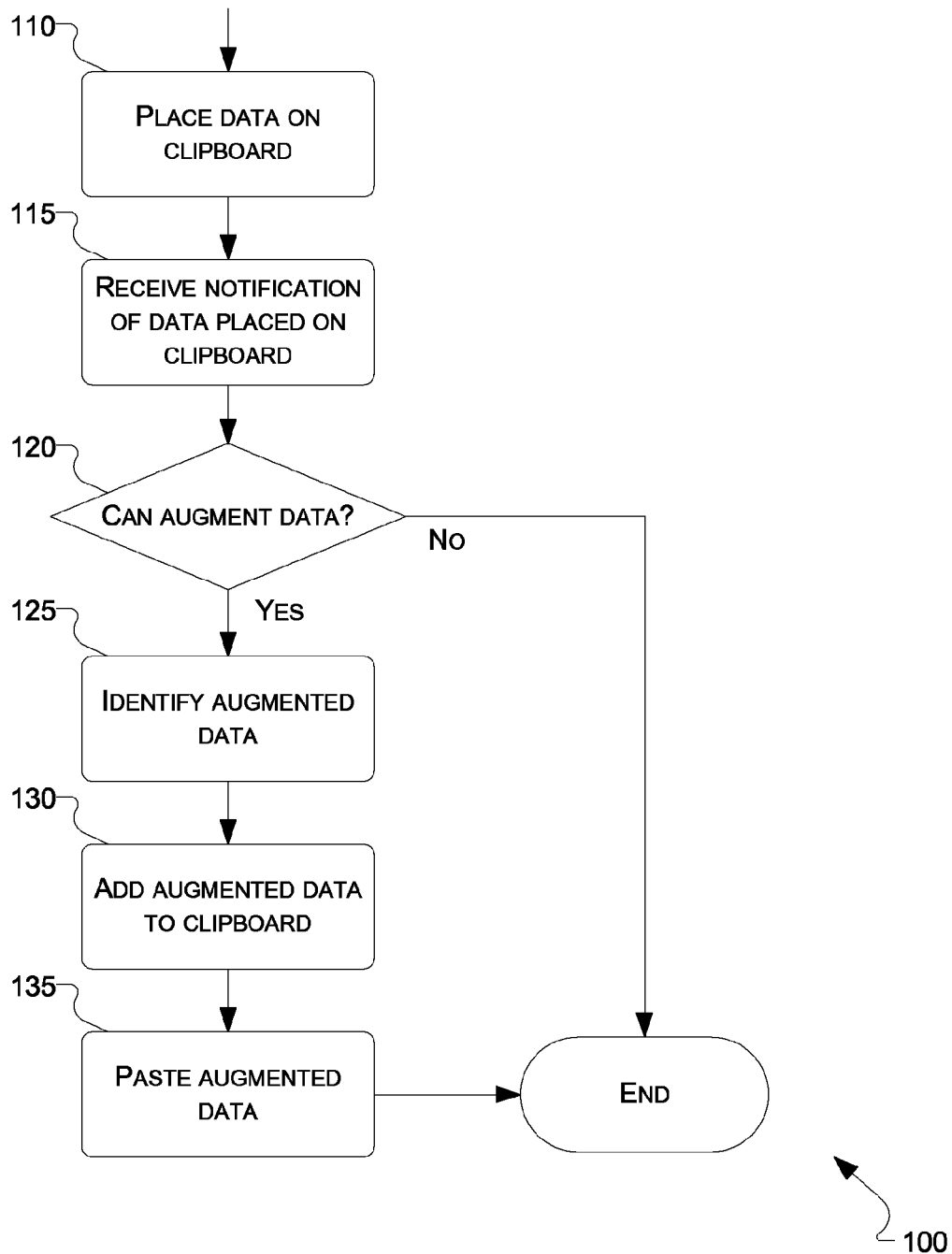
FIG. 1 illustrates an exemplary generalized operational flow including various operations that may be performed when augmenting data on a clipboard.

Turning now to FIG. 1, shown therein is an exemplary generalized operational flow 100 including various operations that may be performed when augmenting data on a clipboard. The following description of FIG. 1 may be made with reference to other figures. However, it should be understood that the operational flow described with reference to FIG. 1 is not intended to be limited to being used with the elements described with reference to these other figures. In addition, while the exemplary operational flow of FIG. 1 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 110, data is placed on a clipboard. This may be accomplished by any of a variety of applications or executable code that has the capability to add data to a clipboard. The data placed on the clipboard may encompass a variety of types of data, including more than one type of data. For example, when a user chooses to copy text in a word processing application, the word processing application may add the text—which is the data being copied in this example—to the clipboard in a variety of formats. One such format added by the word processing application may be a formatted text representation that is perhaps specific to the word processing application. The word processing application might also add formatted text using a common formatted text representation, like Rich Text Format (RTF) or HTML. Such formatted text representations might be useful if the data is later pasted into an application that can recognize or otherwise use formatted text. The same word processing application might also add the copied text in a non-formatted, or plain, text representation. The plain text representation may be useful, for example, when the data is pasted into a text editor that does not understand or display formatted text. The word processing application might also add the text as an image (or may add multiple images). Such image or images may be useful if the text data is pasted into an application—perhaps like an image processing application—that can display images but does not include text editing capabilities.

In some implementations, the data that is placed on the clipboard may be represented, at least in part, using some type of container format. For example, rather than just adding a text representation of, say, a contact—including name, address, phone number(s), and so on—in, say, the vCard format, the source application may first "wrap" the vCard data in a container format that may provide additional information about the enclosed data. One such format might be the same as or similar to the container format that is explained in more detail below, with reference to FIG. 4.

In at least one implementation of operation 115, a clipboard augmentation system may receive some type of notification that indicates that data has been placed on the clipboard. This notification may be implemented in a variety of ways. With some clipboard implementations, executable code may be registered with the clipboard system so that the clipboard system calls the registered code when certain events happen, including when data is added to or changed on the clipboard. For example, in such a system, when new data is added to the clipboard, for example, as part of the execution of an operation like operation 110, the clipboard system may implement the notification of operation 115 by calling code that was previously registered with the clipboard system to be called when data is added to the clipboard.

In the same or another implementation, executable code may periodically "poll" the clipboard to determine if the clipboard contains data to be processed or examined. During such a polling operation, if data is found that needs to be processed—for example, perhaps new data has been added to the clipboard since the last polling operation—then the executable code may provide a notification that data has been placed on the clipboard and should be processed.

In an exemplary implementation of operation 120, it is determined if data on the clipboard may be augmented. If the data may not be augmented, the operational flow 100 may end. If data may be augmented, the operational flow may proceed to operation 125.

The determination of whether data on the clipboard may be augmented may be made using one or more of a variety of criteria. In some implementations, one determining factor may be related to characteristics of the data that was placed on the clipboard and resulted in the notification. For example, the clipboard augmentation code may be able to augment data in one set of formats and not know how to augment data in another set of formats. In an implementation like this, one of the determining factors used to determine if data can be augmented might be whether the data added to the clipboard is in a format that the clipboard augmentation system can recognize and augment. For example, contact information in a particular format may be recognized while general text, contact information in another format, and so on, may not be recognized. Reference information like a URL may be recognized while some other types of reference information may not recognized, and so on.

This determination may also be made in some implementations using a container format, such as, for example, the format described below with reference to FIG. 4. In at least some of these implementations, a system may only be able to augment data that is presented in a particular recognized container format. In some implementations, such systems may also further examine other data provided by the container format to determine if the data may be augmented. For example, if data that uses the format described below with respect to FIG. 4 is added to the clipboard, the type of data—perhaps indicated by the "type" and/or "contenttype" attributes of the data—may be examined. If data of the particular indicated type is recognized and may be augmented, the determination of whether data on the clipboard may be augmented may be made in the affirmative and the operational flow may proceed to operation 125; otherwise the operational flow may end.

In an exemplary implementation of operation 125, the actual augmented data may be determined. For example, if it is determined that, say, contact data represented using the hCard format may be converted, this operation may convert from the hCard format to some other format like the vCard format or some other contact representation or format. In addition, in some implementations, more than one type of augmented data may be generated. That is, some clipboard augmentation systems may have the ability to generate more than one type of augmented data for particular types of data placed on the clipboard.

The identification of the augmented data may be accomplished in a variety of ways. In some implementations, the augmented data may be identified through the use of some kind of transform system that may in turn use transform specifications. A transform specification may consist of one or more rules or sets of data that define how data in one format may be translated to data in another format. One example of such a transform language may be the Extensible Stylesheet Language Transform (XSLT) language. Given an XSLT transform specification, or with some other type of transform specification, the data added to the clipboard may be transformed to produce some or all of the augmented data. The transformation may be implemented using, for example, an XSLT interpreter that accepts input data and an XSLT transform specification and produces output data.

Another manner in which the augmented data may be determined may be executable code. This executable code may have access to the data that was added to the clipboard and may perform any manipulation, processing, or the like, to produce the desired augmented data.

In an exemplary implementation of operation 130, the augmented data previously identified, for example, in operation 125, may be added to the clipboard in some fashion. In some cases the implementation of this operation may simply consist of using a clipboard interaction application programming interface (API) provided by the clipboard system to add new data.

In some cases this operation may also include additional processing to ensure that the data that is added to the clipboard is available in a format that may be usable by a destination. For example, a particular PIM application may understand data provided, for example, in vCard format. However, it may not understand vCard data that is added to the clipboard as text. Instead, it may require that the vCard data is saved to a file, and that a reference to the file be provided on the clipboard instead. In a situation like this, or in another situation where the data must be provided in a particular format requiring further processing, this step may perform such processing. In this example, the operation might save the vCard data to a file and specify the name and location of the newly created file in the data that it adds to the clipboard.

Finally, in an exemplary implementation of operation 135, the data added to the clipboard is pasted into an application or other entity that may accept data pasted from the clipboard.

Generally, as used herein, a "clipboard" or "clipboard system" should be interpreted as an entity that provides functionality associated with the transfer of data between different entities, including, for example, between different applications, web pages, and so on. Some clipboard systems may provide the capabilities of adding data to a clipboard—perhaps associated with a copy or cut operation—and reading data from a clipboard—perhaps associated with a paste operation. The same or other clipboard systems may provide the ability to hold multiple pieces of data, or items, at the same time. Furthermore, the same or other clipboard systems may provide the ability to hold multiple representations or formats for a particular data item. For example, a clipboard system might have the ability to hold, say, a formatted text, plain text, and image representation of the same item. The same or other clipboard systems may enable a destination application to use or request a particular format or representation of an item. For example, a word processing application might use the formatted text representation, a simple text editor the plain text representation, and an image processing application the image representation.

It should also be noted that, as used herein in the context of transferring information, the term "copy" may also include a "cut" operation, where the difference may be that data associated with a copy operation may remain in the location from which it is being copied. In contrast, data being "cut" may be removed or hidden, through some means, from the location from which it is being copied. In both copy and cut operations, data may be placed on the clipboard—the difference may be in what happens at the location from which the data is copied or cut.

Finally, it should be noted that in some implementations cut, copy, and paste operations may be performed through multiple different user interface actions. For example, a user may initiate a copy operation using a "Copy" menu item, using a keyboard command like "Control-C," or some other command, and so on. In some embodiments, a user may also employ one or more of a variety of other actions, such as "drag and drop" gestures. For example, a user may select, indicate, or otherwise identify some data to be copied or cut by, say, selecting the data using computer mouse movements, and then initiate a copy or cut operation by "dragging" the selected entity or data to some other location—perhaps by clicking and holding a mouse button, and then finally "drop" the entity to initiate a paste operation at the indicated location. As used herein, copy, cut, and paste operations should be considered to encompass any set of user actions or gestures, including those associated with such drag and drop systems.

Figure 2:
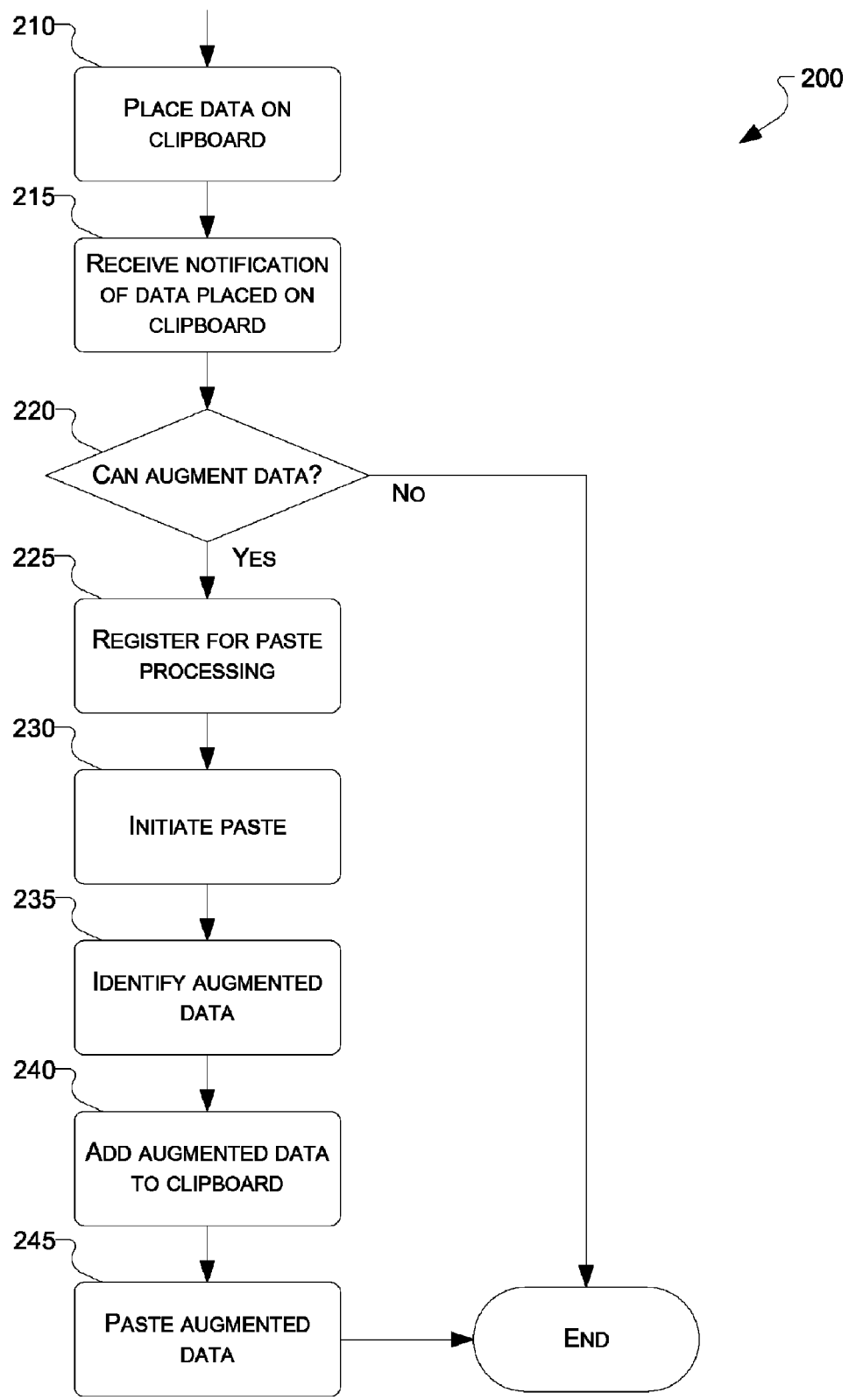
FIG. 2 illustrates an exemplary generalized operational flow including various operations that may be performed when augmenting data on a clipboard, where the identification of the augmented data may only be performed in some cases when the data is needed during a paste operation.

Turning now to FIG. 2, shown therein is an exemplary generalized operational flow 200 including various operations that may be performed when augmenting data on a clipboard using "delayed rendering," where the identification of the augmented data may only be performed in some cases when the data is needed during a paste operation. The following description of FIG. 2 may be made with reference to other figures. However, it should be understood that the operational flow described with reference to FIG. 2 is not intended to be limited to being used with the elements described with reference to these other figures. In addition, while the exemplary operational flow of FIG. 2 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In summary, the operational flow 200 is similar to or the same as the operational flow 100 in many respects, but differs in how the augmented data is added to the clipboard such that the augmented data may only be added to the clipboard when it is needed, for example, to service a paste operation. For example, suppose that part of the augmentation process for a particular type of input data requires that a reference on the clipboard be resolved and the data to which the reference refers be identified. For example, this might be the case where a URL to an image is augmented by retrieving the actual image and adding the image itself to the clipboard. Depending on the size of the image, the characteristics of the network connection to the server or servers on which the image resides, and so on, identifying the augmented data by retrieving the image may take a non-negligible amount of time. In a situation like this, or in other situations, it may be desirable to avoid identifying the augmented data until, for example, one is sure that the augmented data will be used, pasted, or the like. The operational flow 100 described previously with reference to FIG. 1 does not do this, as it may identify the augmented data at close to the same time as the original data is placed on the clipboard.

In some implementations, operation 210 may be similar to the previously discussed operation 110, operation 215 to the previously discussed operation 115, and operation 220 to the previously discussed operation 220. In other implementations, these operations may be different.

Continuing, after it is determined that the data added to the clipboard may be augmented, in an exemplary implementation of operation 225 the operational flow may register for paste processing. In general, this may involve registering for further processing in at least some situations. For example, a clipboard system may provide the ability to call back to a provided function when a user requests that data of a particular type be pasted. In an implementation like this, and continuing with the example where the augmented data requires the download of an image, for example, it may be possible to register to receive a callback when a user initiates a paste and requests an image. When a destination requests an image during a paste operation, the clipboard system or other executable code may call the registered function or functions, and the function may perform any necessary processing to, in this example, download the image and place it on the clipboard. In other implementations, registering for paste processing may involve different or additional steps.

After registering for paste processing, some implementations of the operational flow 200 may not execute any further operations until the point at which a paste operation is initiated that necessitates the further processing for which the registration was submitted, for example, in operation 225. So, in at least one exemplary implementation of operation 230, a paste operation is initiated. For example, in some cases this paste operation may be for a format or formats for which further processing was requested in operation 225. The paste operation may be initiated in a variety of ways, including by using a "Paste" menu item associated with a destination application, by pressing a keyboard command associated with paste—like "Control-V"—and so on.

Now that further processing has been requested, operation 235 and operation 240 may be executed to identify and add the augmented data to the clipboard, and then operation 245 may be executed to paste that data into a destination application. In some cases, the implementations of operation 235, operation 240, and operation 245 may be the same as or similar to the implementation of the similar operations described previously with reference to FIG. 1. That is, operation 235 may be implemented similarly to the previously described operation 125, operation 240 may be implemented similarly to the previously described operation 130, and operation 245 may be implemented similarly to the previously described operation 135. In other implementations, these operations may be implemented differently.

Figure 3:
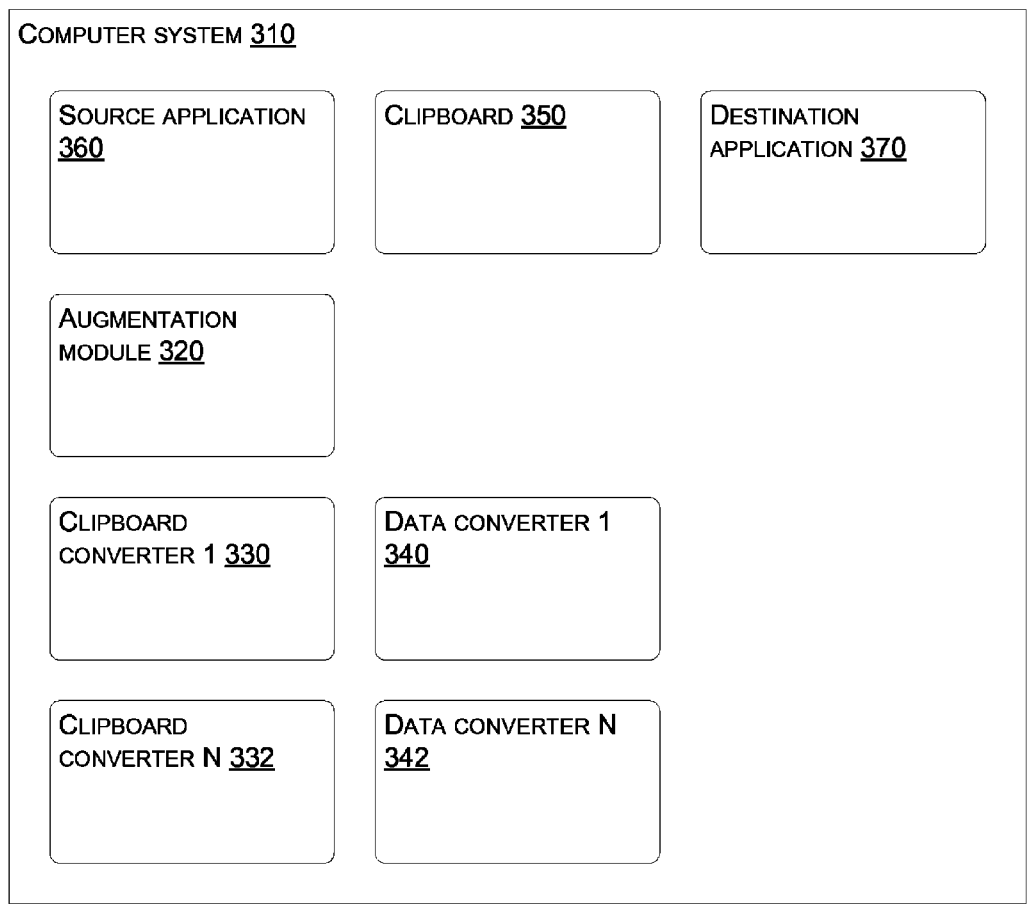
FIG. 3 illustrates an exemplary system in which clipboard augmentation may be performed.

Turning now to FIG. 3, shown therein is an exemplary system 300 in which clipboard augmentation may be performed. The exemplary system 300 may contain a computer system 310, a source application 360, a clipboard 350, a destination application 370, an augmentation module 320, a clipboard converter 1 330, a clipboard converter N 332, a data converter 1 340, and a data converter N 342. This description of FIG. 3 may be made with reference to other figures. However, it should be understood that the elements described with reference to FIG. 3 are not intended to be limited to being used with the elements described with reference to other figures. In addition, while the exemplary diagram in FIG. 3 indicates particular elements, in some implementations not all of these elements may exist, and in some implementations additional elements may exist. Furthermore, while the exemplary diagram shows elements as being part of or contained by a particular computer system, for example, it should be noted that one or more modules may also be implemented by one or more other computer systems and connected to the exemplary illustrated computer system by any means sufficient for exchanging any necessary data.

The exemplary augmentation module 320 may be configured in at least some implementations to perform some or all of the steps introduced previously with respect to the operational flow 100 of FIG. 1 and operational flow 200 of FIG. 2. That is, for example, the augmentation module may be configured to "watch" or be notified when information is added to the clipboard 350 and, when information is added, to in some cases augment the information with additional information.

The source application 360 may be any application or other entity that is capable of placing data on the clipboard 350. The source application may do so in a variety of ways, including through the use of operating system functionality or user interface controls that provide access to the clipboard, through the use of clipboard APIs, and so on. The destination application 370 may similarly be any application that is capable of accepting data from the clipboard 350, perhaps using a paste operation. The destination application may accept information using user interface controls, clipboard APIs, and so on.

The clipboard 350 may represent a clipboard system provided by the operating system, by one or more applications, or by any other entity. As has been discussed previously, a clipboard system like the clipboard system 350 may generally be capable of accepting data (using a "copy" or "cut" operation, for example) and providing data (using a "paste" operation, for example). Some clipboard systems may be capable of interacting across applications on a particular computer system or computing device, others may be capable of operating across computer systems running the same or different operating systems, others may only operate across instances of a particular application or applications, and so on. Furthermore, as also has been discussed previously, clipboard systems may provide a variety of additional functionality, including the capability of storing a particular data item using multiple different formats, or the capability of performing delayed rendering, where the addition of data to the clipboard may be postponed, for example, until the time particular data is requested.

The augmentation module 320 may in some implementations use one or more clipboard converters, including clipboard converter 1 330 and clipboard converter N 332. Generally, a clipboard converter may be capable of converting one or more particular types of input into one or more particular types of output. For example, an hCard-to-vCard clipboard converter might convert hCard data to the vCard format (after which the augmentation module might add the augmented vCard data to the clipboard). A clipboard converter may produce its output data using a transform specification, arbitrary executable code, or some other mechanisms, for example.

In some implementations, a clipboard converter may further be responsible for additional processing that may be required or useful in particular environments, operating systems, with particular applications, or the like. That is, a clipboard converter may also perform "platform-dependent" processing that may be useful on a certain platform or in a certain environment or environments. For example, if a particular PIM application requires that contact data in the vCard format be provided as a reference to a file (instead of, for example, simply as text on the clipboard), then a clipboard converter may save the converted vCard data to a file and add a reference to that file to the clipboard.

This difference between platform-independent processing and platform-dependent processing may in some implementations be related to the use of one or more data converters, such as data converter 1 340 and data converter N 342. Generally, a data converter may be responsible for producing data in one or more formats given input data in one or more other formats. A data converter may generally not be responsible for performing platform-dependent processing, and in this case, such platform-dependent processing may then may be left to a clipboard converter that uses a particular data converter. For example, using the previously presented example where the input is contact data in the hCard format and the desired output is a file that contains vCard data, a clipboard converter may receive the input hCard data, may then use a data converter to convert from the hCard representation to a vCard representation, and may then save the converted vCard data produced by the data converter to a file and add a reference to the new file to the clipboard.

Turning now to FIG. 4, shown therein is an exemplary system 400 that includes a graphical example of one mechanism for representing clipboard data, including a transfer representation of data. The exemplary system may contain clipboard data 410, structured data 420, feed data 450, and presentation data 480. Structured data may be associated with one or more structured data formats, such as structured data format 1 430 and structured data format N 432. A structured data format may contain one or more items, such as item 1 434 and item N 436. Feed data may be associated with feeds like feed 1 460 and feed N 462, while a feed may be associated with some number of sets of feed items, such as feed items 1 464 and feed items N 468. A set of feed items, like feed items 1 464, may be associated with some number of feed items, like feed item 1 466 and feed item N 467. Finally, presentation data 480 may be associated with one or more presentation formats, like presentation format 1 490 and presentation format N 492. This description of FIG. 4 may be made with reference to other figures. However, it should be understood that the elements described with reference to FIG. 4 are not intended to be limited to being used with the elements described with reference to other figures. In addition, while the exemplary diagram in FIG. 4 indicates particular elements, in some implementations not all of these elements may exist, and in some implementations additional elements may exist.

Clipboard data may be represented in a wide variety of formats. In some implementations, clipboard data may include some structured representation of the data itself, feed or subscription information about the structured data or about other data, and additional presentation or display representations of the structured data.

In some implementations, clipboard data, such as the clipboard data 410, may be represented using a markup language, like XML, for example, or some other representation. It should be noted that while the system 400 and the clipboard data 410 may be described herein with reference to XML elements, XML attributes, and so on, the use of XML is not required and any description of such use herein is provided for exemplary purposes only. The clipboard data may be represented in any number of a wide variety of alternate formats. Furthermore, while particular elements, attributes, and so on, may be referred to for exemplary purposes using a particular name, such elements, attributes, and so on, may be referred to using any name.

In some implementations, the clipboard data 410 may contain header information as well as one or more of different types of data, including the actual structured data, feed data, and presentation data. In general each of these types of data may refer to the same information, but in different formats. One purpose of providing multiple formats in this manner may be to make it more likely that a destination may find data appropriate for its use.

When represented using a markup language, perhaps like XML, the structure of the clipboard data 410 might be the same as or similar to the following:

| | |
|---|---|
| <liveclipboard> | |
|   <lc:data> | 0 or 1 elements |
|     <lc:format> | 1 or more elements |
|       <lc:item/> | 1 or more elements |
|     </lc:format> | |
|   </lc:data> | |
|   <lc:feeds> | 0 or 1 elements |
|     <lc:feed> | 1 or more elements |
|       <lc:feeditems> | 0 or 1 elements |
|         <lc:feeditem> | 0 or more elements |
|       </lc:feeditems> | |
|     </lc:feed/> | |
|   </lc:feeds> | |
|   <lc:presentations> | 0 or 1 elements |
|     <lc:format/> | 1 or more elements |
|   </lc:presentations> | |
| </liveclipboard> | |

In some implementations, the "liveclipboard" element may be associated with the clipboard data 410, and the "data", "feeds", and "presentations" elements, and their child elements, may be associated, respectively, with the structured data 420, feed data 450, and presentation data 480, and their child elements, as described with reference to FIG. 4. In addition, in this example data, the use of the string "lc:" might indicate a particular XML namespace, perhaps including a namespace related to transferring structured data using a clipboard as described herein.

In some cases, header or other information may be associated with the clipboard data 410. This data may be associated with some or all of "version", "source", and "description" attributes, as well as other attributes. The "version" attribute may represent the version of the clipboard data format used in a particular instance of the clipboard data. The "source" attribute may represent a reference, like a URL, to the source provider of the clipboard data content. And the "description" attribute may represent a human readable description of clipboard data content.

In some implementations, the clipboard data may be associated with at least one of structured data 420, feed data 450, and presentation data 480. In the same or other implementations, the clipboard data may be associated with more than one of these elements, including some implementations where all three of the elements, or possibly other elements, may be included.

The first set of data that may be included is the structured data itself, which, in some implementations, may be associated with the structured data 420. In the same or other implementations the structured data 420 may be associated with data represented using defined data formats, such as hCard and vCard for representing contact information, hCal and iCal for representing event information, and so on. However, any defined format or structured data may be used or associated with the structured data 420.

When the clipboard data 410 contains structured data 420, it may be represented, for example, in a manner similar to or the same as the following:

| | |
|---|---|
| <lc:data> | 0 or 1 elements |
|   <lc:format> | 1 or more elements |
|     <lc:item/> | 1 or more elements |
|   </lc:format> | |
| </lc:data> | |

When represented like this, the "format" element may correspond to the structured data format 1 430 and the structured data format N 432, while the "item" element may correspond to the item 1 434 and the item N 436.

A structured data format, like structured data format 1 430, may define the format of the child "item" elements, like item 1 434 and item N 436, with which it is associated. A structured data format may be associated with some or all of the "contenttype", "type", and "encoding" attributes, as well as other attributes. The "contenttype" attribute may represent the content type of data for the contained "item" elements. For example, this attribute may contain data defined by the Internet Assigned Names Association (IANA), like "text/calendar", "application/xhtml+xml", and so on. The "type" attribute may represent a schema or format type of the data for the contained "item" elements. This may be useful, for example, if an IANA format identifier provided may not be sufficient to completely determine the type. For example, when the "contenttype" attribute has a value of "text/calendar" there may be sufficient information to determine that the data associated with an "item" element is formatted using the iCal standard. In contrast, when the "contenttype" attribute has a value such as "application/xhtml+xml", additional information may be necessary to determine the format of the data in the "item" element. For example, in this case, the "type" attribute might have a value of "vevent", which might indicate that the data is formatted using the hCal standard. Finally, an "encoding" attribute may represent how the data associated with the "item" elements is encoded.

In some implementations, when multiple formats are provided, such as with multiple instances of structured data format 1 430 and structured data format N 432, it may be useful to order the formats in some fashion. For example, "higher fidelity" formats—formats that may provide more data, for example—might be ordered before "lower fidelity" formats that do not provide as much data. (Lower fidelity formats may be more widely accepted by destinations, and so still may be preferable for some uses, or for some applications, web pages, and so on.)

After the format of the data is defined, for example, using a structured data format, like structured data format 1 430, one or more items that are represented using that format may be provided. These items may correspond, for example, to the item 1 434 and item N 436. In some representations, these items may be associated with "item" elements that are perhaps located as children of "data" and "format" elements.

An "item" may represent data itself and may be associated with some or all of "description" and "ref" attributes, as well as other attributes. The "description" attribute may represent additional data defined by the user or application. The "ref" attribute may contain a reference, for example a URL, associated with the item.

The "item" element may also contain data itself. For example, when using XML, if the data can be represented as well-formed XML data that uses, say, the UTF-8 encoding, then the XML corresponding to the data may be appended as a child of the "item" element. In some other cases, for example when the data may not be represented as well-formed UTF-8 XML data, the data may reside in a CDATA section for the "item" element, optionally encoded in the format described by the "encoding" attribute of the enclosing "format" element.

Data associated with either or both of the "format" and "item" elements may include both "by value" and "by reference" data. That is, the actual data itself may be included, for example, in the "item" element. Alternatively, a reference to the data—which would then be located elsewhere—may instead or also be included.

In some implementations, when there are multiple structured data formats, the ordering of items beneath each format may indicate how items correspond to each other. For example, if clipboard data 410 includes two structured data formats X and Y, corresponding in some implementations to two "format" elements, the first "item" element of format X may correspond to the first "item" element of format Y. That is, the first "item" element for each format may refer to the same item, but represented in different formats. Furthermore, in some implementations, when feed data—discussed in more detail below—exists, including feed data that includes feed items, the ordering of "item" elements may correspond to the ordering of "feeditem" elements, which may enable the correspondence of items to their location in a feed.

As just one example, suppose that the clipboard data includes contact information for a particular contact, and that the contact information itself is represented using the hCard standard. In such an example, the contact information itself may be represented as follows:

```
<div class='vcard'>
    <span class='fn n'>
        <span class='given-name'>John</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'>98052</span>
    </div>
```

```
    <div class='tel'>
        <span class='type'>work</span>
        <abbr class='type' title='voice'> phone: </abbr>
        <span class='value'>+1-425-555-1212</span>
    </div>
</div>
```

A corresponding clipboard data representation might consist of the following data:

```
<?xml version="1.0" encoding="utf-8"?>
<liveclipboard version="0.92"
xmlns:lc="http://www.microsoft.com/schemas/liveclipboard">
    <lc:data>
        <lc:format type="vcard" contenttype="application/xhtml+xml">
            <lc:item>
                <div class='vcard'>
                    <span class='fn n'>
                        <span class='given-name'>John</span>
                        <span class='family-name'>Doe</span>
                    </span>
                    <div class='adr'>
                        <span class='type'>work</span> address:
                        <span class='street-address'>1 Microsoft Way</span>,
                        <span class='locality'>Redmond</span>,
                        <span class='region'>WA</span>
                        <span class='postal-code'> 98052</span>
                    </div>
                    <div class='tel'>
                        <span class='type'>work</span>
                        <abbr class='type' title='voice'> phone: </abbr>
                        <span class='value'>+1-978-555-1212</span>
                    </div>
                </div>
            </lc:item>
        </lc:format>
    </lc:data>
</liveclipboard>
```

As another example, suppose that two contacts—each represented using hCard—are to be represented as clipboard data. The contacts themselves might be represented as follows:

```
<div class='vcard'>
    <span class='fn n'>
        <span class='given-name'>John</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'>98052</span>
    </div>
    <div class='tel'>
        <span class='type'>work</span>
        <abbr class='type' title='voice'> phone: </abbr>
        <span class='value'>+1-425-555-1212</span>
    </div>
</div>
<div class='vcard'>
    <span class='fn n'>
        <span class='given-name'>George</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
        <span class='region'>WA</span>
```

```
        <span class='postal-code'>98052</span>
     </div>
     <div class='tel'>
        <span class='type'>work</span>
        <abbr class='type' title='voice'> phone: </abbr>
        <span class='value'>+1-425-555-1212</span>
     </div>
  </div>
```

And the corresponding clipboard data representation might be as follows:

```
<?xml version="1.0" encoding="utf-8"?>
<liveclipboard version="0.92"
xmlns:lc="http://www.microsoft.com/schemas/liveclipboard">
   <lc:data>
      <lc:format type="vcard" contenttype="application/xhtml+xml">
         <lc:item>
            <div class='vcard'>
               <span class='fn n'>
                  <span class='given-name'>John</span>
                  <span class='family-name'>Doe</span>
               </span>
               <div class='adr'>
                  <span class='type'>work</span> address:
                  <span class='street-address'>1 Microsoft Way</span>,
                  <span class='locality'>Redmond</span>,
                  <span class='region'>WA</span>
                  <span class='postal-code'> 98052</span>
               </div>
               <div class='tel'>
                  <span class='type'>work</span>
                  <abbr class='type' title='voice'> phone: </abbr>
                  <span class='value'>+1-978-555-1212</span>
               </div>
            </div>
         </lc:item>
         <lc:item>
            <div class='vcard'>
               <span class='fn n'>
                  <span class='given-name'>George</span>
                  <span class='family-name'>Doe</span>
               </span>
               <div class='adr'>
                  <span class='type'>work</span> address:
                  <span class='street-address'>1 Microsoft Way</span>,
                  <span class='locality'>Redmond</span>,
                  <span class='region'>WA</span>
                  <span class='postal-code'> 98052</span>
               </div>
               <div class='tel'>
                  <span class='type'>work</span>
                  <abbr class='type' title='voice'> phone: </abbr>
                  <span class='value'>+1-978-555-1212</span>
               </div>
            </div>
         </lc:item>
      </lc:format>
   </lc:data>
</liveclipboard>
```

As discussed previously, the clipboard data may include alternate representations or formats for a single item. As one example, suppose that an event may be represented using both the iCal and hCal standards. With such an example, the iCal data might be like the following:

```
BEGIN:VCALENDAR
METHOD:PUBLISH
VERSION:2.0
BEGIN:VEVENT
URL:http://www.microsoft.com/events/E1-001-000629872-2
DTSTART:20060208T180000
DTEND:20060208T180000
DTSTAMP:20060119T184157Z
SUMMARY:The Bellevue Vegetarian February Meetup
DESCRIPTION:Let's all get together and meet over a great veggie dinner
at Teapot Vegetarian House in Redmond!
UID:E1-001-000629872-2
LOCATION:Bellevue\,Washington 98004
END:VEVENT
END:VCALENDAR
```

In the same example, the corresponding hCal data might be like the following:

```
<div class='vevent'>
   <a class='url' href='http://www.microsoft.com/events/E1-001-000629872-2'>
      <span class='summary'>The Bellevue Vegetarian February Meetup</span>
   </a>
   <div class='description'>Let's all get together and meet over a great veggie
dinner at Teapot Vegetarian House in Redmond!</div>
   <div>Start Date: <abbr class='dtstart' title='20060208T180000'>February 8,
2006</abbr></div>
   <div>End Date: <abbr class='dtend' title='20060208T180000'>February 8,
2006</abbr></div>
   <div>Location: <span class='location'>Bellevue,Washington 98004</span></div>
   <div>UID: <span class='uid'>E1-001-000629872-2</span></div>
   <div>Last Updated: <abbr class='dtstamp' title='20060119T184157Z'>January 19,
2006</abbr></div>
</div>
```

Both of these formats might be represented in clipboard data in a manner similar to or the same as the following:

```
<?xml version="1.0" encoding="utf-8" ?>
<liveclipboard version="0.92"
xmlns:lc="http://www.microsoft.com/schemas/liveclipboard">
   <lc:data>
      <lc:format type="vcalendar" contenttype="application/xhtml+xml">
```

-continued

```
<lc:item>
    <div class='vevent'>
        <a class='url' href='http://www.microsoft.com/events/E1-001-000629872-2'>
            <span class='summary'>The Bellevue Vegetarian February Meetup</span>
        </a>
        <div class='description'>Let's all get together and meet over a great veggie dinner at Teapot Vegetarian House in Redmond!</div>
        <div>Start Date: <abbr class='dtstart' title='20060208T180000'>February 8, 2006</abbr></div>
        <div>End Date: <abbr class='dtend' title='20060208T180000'>February 8, 2006</abbr></div>
        <div>Location: <span class='location'>Bellevue,Washington 98004</span></div>
        <div>UID: <span class='uid'>E1-001-000629872-2</span></div>
        <div>Last Updated: <abbr class='dtstamp' title='20060119T184157Z'>January 19, 2006</abbr></div>
    </div>
</lc:item>
</lc:format>
<lc:format contenttype="text/calendar">
    <lc:item>
        <![CDATA[
        BEGIN:VCALENDAR
        METHOD:PUBLISH
        VERSION:2.0
        BEGIN:VEVENT
        URL:http://www.microsoft.com/events/E1-001-000629872-2
        DTSTART:20060208T180000
        DTEND:20060208T180000
        DTSTAMP:20060119T184157Z
        SUMMARY:The Bellevue Vegetarian February Meetup
DESCRIPTION:Let's all get together and meet over a great veggie dinner at Teapot
Vegetarian House in Redmond!
        UID:E1-001-000629872-2
        LOCATION:Bellevue\,Washington 98004
        END:VEVENT
        END:VCALENDAR
        ]]>
    </lc:item>
</lc:format>
</lc:data>
</liveclipboard>
```

Some clipboard data representations may be associated with subscription or feed information that may be, in some implementations, associated with the feed data 450. Such information may be useful, for example, to represent feeds of data, enable subscriptions to data or feeds, and so on. In one example, item data may be provided using, for example, the structured data 420, and information about a feed that may be used to update the item data may be provided using the feed data 450. For example, an initial set of contacts might be provided using the structured data 420, and information in the feed data 450 may be provided to enable an application to later update the contacts initially provided using the structured data. In another example, the feed data may refer to some other data or information. For example, the feed data may refer to an RSS ("Really Simple Syndication" or "Rich Site Summary"), Atom, or other feed that contains additional or other information.

Feed data may be represented in multiple ways, including, for example, in a manner similar to the following:

```
<lc:feeds>                  0 or 1 elements
    <lc:feed>               1 or more elements
        <lc:feeditems>      0 or 1 elements
            <lc:feeditem>   0 or more elements
        </lc:feeditems>
    </lc:feed/>
</lc:feeds>
```

When represented like this, the "feeds" element may correspond to the feed data 450, the "feed" element may correspond to the feed 1 460 and feed N 462, the "feeditems" element may correspond to the feed items 1 464 and feed items N 468, and the "feeditem" element may correspond to the feed item 466 and feed item N 467.

A feed, like feed 1 460 and feed N 462, may have associated information about the feed. A feed may be associated with some or all of the "type", "ref", "description", and "authtype" attributes, as well as other attributes. The "type" attribute may represent the type of data that exists at the location specified, for example, by the "ref" attribute. For example, the "type" attribute may include values such as "RSS", "Atom", and so on, or other values. Generally, a wide variety of feed types may be used, depending upon, for example, the capabilities of the endpoints. For example, some implementations may support RSS, other implementations may support RSS and also support extensions to RSS to implement other functionality, and so on. For example, some endpoints may support "Simple Sharing Extensions" to enable bidirectional synchronization of data using RSS or other feed types. The "ref" attribute may represent a reference associated with the feed, like a URL. In some implementations, this reference may be the location of the feed itself. The "description" may represent some user-specified data associated with the feed. Finally, the "authtype" attribute may represent some type of authentication technique or techniques that may or must be used when accessing the feed.

Each feed may contain some number of sets of feed items, such as feed items 1 464 and feed items N 468. These may be represented in some cases by one or more "feeditems" elements. In turn, a set of feed items may contain some number of feed items, which might be represented using "feeditem" elements.

A set of feed items may be associated with the "contenttype", "type", and "xpath" attributes, as well as other attributes. The "contenttype" attribute may represent the content type of data for the contained "feeditem" elements. For example, similar to the structured data, this attribute may contain data defined by IANA, like "text/calendar", "application/xhtml+xml", and so on. The "type" attribute may represent a schema or format type of the data for the contained "feeditem" elements. This may be useful, like before and for example, if an IANA format identifier provided may not be sufficient to completely determine the type. For example, when the "contenttype" attribute has a value of "text/calendar" there may be sufficient information to determine that the data associated with a "feeditem" element is formatted using the iCalendar standard. In contrast, when the "contenttype" attribute has a value such as "application/xhtml+xml", additional information may be necessary to determine the format of the data in the "feeditem" element. For example, in this case, the "type" attribute might have a value of "vevent", which might indicate that the data is formatted using the hCal standard.

The "xpath" attribute may represent a query—perhaps using the XPath standard, but also represented using some other query language or standard—that returns or otherwise identifies data items from the feed. For example, if a feed is retrieved using the "ref" attribute of the parent "feed" element, in some cases the query represented by the "xpath" attribute may be executed against the contents of the retrieved feed to identify particular data items in the feed. This may enable the feed to contain a variety of data, only some of which may be relevant for or associated with the clipboard data, and still enable the clipboard data to be associated directly with the relevant data. In addition, this may enable the relevant portions of the data to be changed, perhaps at some later time, by only changing the value of this attribute; the actual data in the feed would not necessarily need to change. In implementations that do not use the "xpath" attribute, or a similar type of attribute or query, all of the data associated with the feed may be relevant to, for example, a subsequent update or data retrieval operation.

Similar to with the structured data discussed previously, in some implementations, when multiple formats are provided, it may be useful to order the formats in some fashion. For example, "higher fidelity" formats—formats that may provide more data, for example—might be ordered before "lower fidelity" formats that do not provide as much data. As before, lower fidelity formats may be more widely accepted, and so still may be preferable for some uses, or for some applications, web pages, and so on.

A set of feed items may in turn be associated with or contain some number of "feeditem" elements, which may in some cases, enable information retrieved from the feed to be linked to "item" elements provided, for example, in the structured data 420. A "feeditem" element may be associated with an "id" attribute, or some other attribute or data, which may represent some type of identifier, perhaps a unique identifier, for the feed item. In implementations that do not use or include elements like the "feeditem" element, data may still be retrieved and used, but in some cases the data may not be linked to the structured data also provided with the clipboard data.

In at least some implementations, if there are multiple instances of feeds, like feed 1 460 and feed N 462, the ordering of "feeditem" elements beneath each feed may indicate that particular items correspond to each other. For example, in the case where there are two "feed" elements named X and Y, the first "feeditem" element associated with "feed" X may correspond to the first "feeditem" element associated with "feed" Y. Also, in clipboard data that has structured data 420, the ordering of "feeditem" elements may correspond to the ordering of "item" elements provided in the structured data 420.

An example clipboard data representation that uses feed data 450 is provided below, after the discussion of presentation data.

Finally, some clipboard data representations may be associated with presentation data, such as presentation data 480 and presentation format 1 490 and presentation format N 492. Such data may provide a formatted or display representation of data that may also be provided elsewhere in the clipboard data. For example, where the structured data 420 includes a contact, perhaps in the hCard or vCard formats, the presentation data may be associated with an instance of the same contact data represented using HTML, JPEG, or some other presentation data format. In many cases destination applications, web pages, or the like, that do not understand data in one or more structured data formats may still understand a display representation, like HTML or JPEG, and so may still be able to at least display or present the clipboard data.

Presentation may be represented in multiple ways, including, for example, in a manner similar to the following:

| | |
|---|---|
| <lc:presentations> | 0 or 1 elements |
| <lc:format/> | 1 or more elements |
| </lc:presentations> | |

When represented like this, the "presentations" element may correspond to the presentation data 480, and the "format" element may correspond to the presentation format 1 490 and presentation format N 492.

The presentation data 480 may be associated with some number of presentation formats. Each presentation format, perhaps represented by a "format" element, may be associated with some or all of the "contenttype", "type", "encoding", "description", and "ref" attributes, as well as other attributes. The "contenttype" attribute may represent the content type of data, for example, for a CDATA section associated with this format. For example, this attribute may contain data defined by IANA, like "text/html", "application/xhtml+xml", and the like. The "type" attribute may represent a schema or format type of the data for the format. Like before, this may be useful, for example, if an IANA format identifier provided may not be sufficient to completely determine the type. The "encoding" attribute may represent how the data associated with, for example, a CDATA section is encoded. The "description" attribute may represent data defined by the user or application. Finally, the "ref" attribute may contain a reference, for example a URL, associated with the item.

Similar to with structured data, a "format" element may also contain data itself. For example, when using XML, if the data can be represented as well-formed XML data that uses the UTF-8 encoding, then the XML corresponding to the data may be appended as a child of the "format" element. In some other cases, for example when the data may not be represented as well-formed UTF-8 XML data, the data may reside in a CDATA section for the "format" element, optionally encoded in the format described by the "encoding" attribute.

As just one example, suppose clipboard data is desired that represents contact information in the hCard format, an RSS feed associated with the contact information—so the contact information can be updated at some later point in time, for example—and an HTML representation of the contact data—perhaps useful, for example, if a destination of the clipboard data does not understand the hCard format.

With such an example, the hCard contact data might be represented as follows:

```
<div class='vcard'>
  <span class='fn n'>
    <span class='given-name'>John</span>
    <span class='family-name'>Doe</span>
  </span>
  <div class='adr'>
    <span class='type'>work</span> address:
    <span class='street-address'>1 Microsoft Way</span>,
    <span class='locality'>Redmond</span>,
    <span class='region'>WA</span>
    <span class='postal-code'>98052</span>
  </div>
  <div class='tel'>
    <span class='type'>work</span>
```

-continued

```
    <abbr class='type' title='voice'> phone: </abbr>
    <span class='value'>+1-425-555-1212</span>
  </div>
</div>
<div class='vcard'>
  <span class='fn n'>
    <span class='given-name'>George</span>
    <span class='family-name'>Doe</span>
  </span>
  <div class='adr'>
    <span class='type'>work</span> address:
    <span class='street-address'>1 Microsoft Way</span>,
    <span class='locality'>Redmond</span>,
    <span class='region'>WA</span>
    <span class='postal-code'>98052</span>
  </div>
  <div class='tel'>
    <span class='type'>work</span>
    <abbr class='type' title='voice'> phone: </abbr>
    <span class='value'>+1-425-555-1212</span>
  </div>
</div>
```

In the same example, the RSS data might be represented as follows:

```
<?xml version="1.0" encoding="utf-8" ?>
<rss version="2.0">
  <channel>
    <title>My Friends </title>
    <link>http://localhost/FriendsFeed.ashx</link>
    <pubDate>Wed, 15 Mar 2006 09:05:43 -0800</pubDate>
    <lastBuildDate>Wed, 15 Mar 2006 09:05:43 -0800</lastBuildDate>
    <item>
      <title>John Doe</title>
      <description>
        <![CDATA[
          <div class='vcard'>
            <span class='fn n'>
              <span class='given-name'>John</span>
            <span class='family-name'>Doe</span>
            </span>
            <div class='adr'>
              <span class='type'>work</span> address:
              <span class='street-address'>1 Microsoft Way</span>,
              <span class='locality'>Redmond</span>,
              <span class='region'>WA</span>
            <span class='postal-code'>98052</span>
            </div>
            <div class='tel'>
              <span class='type'>work</span>
              <abbr class='type' title='voice'> phone: </abbr>
              <span class='value'>+1-425-555-1212</span>
            </div>
          </div>
        ]]>
      </description>
      <enclosure
url="http://server/SIS/contact.vcf?puid=1688852012477191&roid=4EB2576478DA9846A06EFCC1
2FFC0185"/>
    </item>
    <item>
      <title>George Doe</title>
      <description>
        <![CDATA[
          <div class='vcard'>
            <span class='fn n'>
              <span class='given-name'>George</span>
            <span class='family-name'>Doe</span>
            </span>
            <div class='adr'>
              <span class='type'>work</span> address:
              <span class='street-address'>1 Microsoft Way</span>,
              <span class='locality'>Redmond</span>,
              <span class='region'>WA</span>
```

```
            <span class='postal-code'>98052</span>
        </div>
        <div class='tel'>
            <span class='type'>work</span>
            <abbr class='type' title='voice'> phone: </abbr>
            <span class='value'>+1-425-555-1212</span>
        </div>
        </div>
      ]]>
    </description>
    <enclosure url="
http://server/SIS/contact.vcf?puid=1688852012477191&roid=0B69B846ED7E2241AE4F6773EA749
183"/>
    </item>
    </channel>
</rss>
```

And in the same example, the HTML data for the contact information might be represented as follows:

```
<html>
<body>
<table>
    <tr>
        <th><b>Fullname</b></th>
        <th><b>Street Address</b></th>
        <th><b>City</b></th>
        <th><b>State</b></th>
        <th><b>Zip</b></th>
        <th><b>Phone</b></th>
    </tr>
    <tr>
        <td>John Doe</td>
        <td>1 Microsoft Way </td>
        <td>Redmond</td>
```

-continued

```
        <td>WA</td>
        <td>98052</td>
        <td>+1-425-555-1212</td>
    </tr>
    <tr>
        <td>George Doe</td>
        <td>1 Microsoft Way </td>
        <td>Redmond</td>
        <td>WA</td>
        <td>+1-425-555-1212</td>
    </tr>
</table>
</body>
</html>
```

Given all of these data representations, a corresponding clipboard data representation might consist of the following data:

```
<?xml version="1.0" encoding="utf-8" ?>
<liveclipboard version="0.92"
xmlns:lc="http://www.microsoft.com/schemas/liveclipboard">
<lc:data>
    <lc:format type="vcard" contenttype="application/xhtml+xml">
        <lc:item>
            <div class='vcard'>
                <span class='fn n'>
                    <span class='given-name'>John</span>
                    <span class='family-name'>Doe</span>
                </span>
                <div class='adr'>
                    <span class='type'>work</span> address:
                    <span class='street-address'>1 Microsoft Way</span>,
                    <span class='locality'>Redmond</span>,
                    <span class='region'>WA</span>
                    <span class='postal-code'> 98052</span>
                </div>
                <div class='tel'>
                    <span class='type'>work</span>
                    <abbr class='type' title='voice'> phone: </abbr>
                    <span class='value'>+1-978-555-1212</span>
                </div>
            </div>
        </lc:item>
        <lc:item>
            <div class='vcard'>
                <span class='fn n'>
                    <span class='given-name'>George</span>
                    <span class='family-name'>Doe</span>
                </span>
                <div class='adr'>
                    <span class='type'>work</span> address:
                    <span class='street-address'>1 Microsoft Way</span>,
                    <span class='locality'>Redmond</span>,
                    <span class='region'>WA</span>
```

-continued

```
            <span class='postal-code'>98052</span>
         </div>
         <div class='tel'>
            <span class='type'>work</span>
            <abbr class='type' title='voice'> phone: </abbr>
            <span class='value'>+1-978-555-1212</span>
         </div>
      </div>
   </lc:item>
  </lc:format>
 </lc:data>
 <lc:feeds>
  <lc:feed type="RSS" ref="http://localhost/FriendsFeed.ashx" description="My Friends"
authtype="none">
     <lc:feeditems type="vcard" contenttype="application/xhtml+xml"
xpath="/rss/channel/item/description">
        <lc:feeditem
id="http://server/SIS/contact.vcf?puid=1688852012477191&roid=4EB2576478DA9846A06EF
CC12FFC0185"/>
        <lc:feeditem
id="http://server/SIS/contact.vcf?puid=1688852012477191&roid=0B69B846ED7E2241AE4F6
773EA749183"/>
</lc:feeditems>
     </lc:feed>
    </lc:feeds>
  <lc:presentations>
   <lc:format contenttype="text/html">
      <table>
         <tr>
           <th>Fullname</th>
             <th>Street Address</th>
             <th>City</th>
             <th>State</th>
             <th>Zip</th>
             <th>Phone</th>
             </tr>
         <tr>
           <td>John Doe</td>
             <td>1 Microsoft Way </td>
             <td>Redmond</td>
             <td>WA</td>
             <td>+1-425-555-1212</td>
             </tr>
         <tr>
           <td>George Doe</td>
             <td>1 Microsoft Way </td>
             <td>Redmond</td>
             <td>WA</td>
             <td>+1-425-555-1212</td>
             </tr>
         </table>
      </lc:format>
    <lc:presentations>
</liveclipboard>
```

Example Computing Environment

Figure 5:
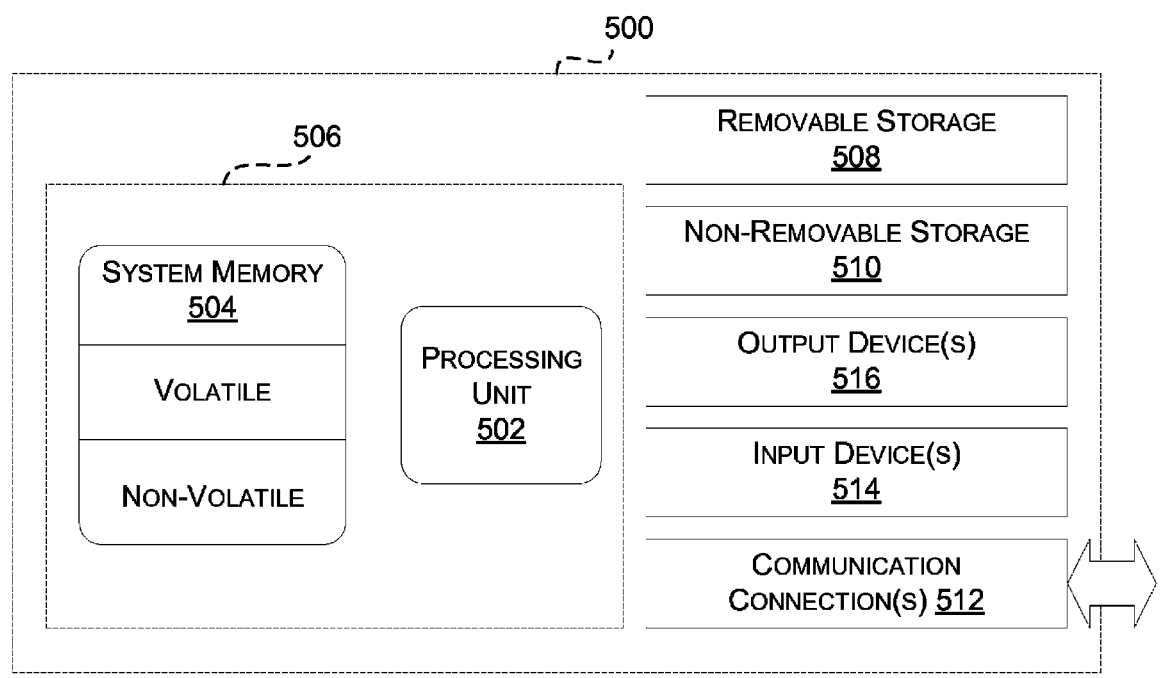
FIG. 5 illustrates an exemplary computer device in which the various technologies described herein may be implemented.

Turning now to FIG. 5, this figure and the related discussion are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 500 illustrated in FIG. 5.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include without limitation, both volatile and nonvolatile memory, communications media, data storage devices, removable and/or non-removable media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 500 illustrated in FIG. 5, in its most basic configuration, includes at least one processing unit 502 and memory 504. In some implementations, the computing device 500 may implement all or part of, for example, the computer system 310, described previously with reference to FIG. 3. In some implementations, the processing unit 502 may be a general purpose central processing unit (CPU), as exists, for example, on a variety of computers, including desktop and laptop computers. Depending on the exact configuration and type of computing device, the memory 504 may be volatile (such as RAM), non-volatile (such as ROM, flash memory, etc.), or some combination of the two. This most basic configuration is illustrated in FIG. 5 by dashed line 506. Additionally, the computing device 500 may also have additional features and functionality. For example, the computing device 500 may also include additional storage (removable and/or non-removable) including, but not limited to, magnetic or optical disks or tape. Such additional storage is illustrated in FIG. 5 by the removable storage 508 and the non-removable storage 510.

The computing device 500 may also contain one or more communications connection(s) 512 that allow the computing device 500 to communicate with other devices and services. The computing device 500 may also have one or more input device(s) 514 such as an image input devices like cameras or scanners, keyboards, mice, pens, voice input devices including microphone arrays, touch input devices, and so on. One or more output device(s) 516 such as a display, speakers, printer, and so on, may also be included in the computing device 500.

Those skilled in the art will appreciate that the technologies described herein may be practiced with computing devices other than the computing device 500 illustrated in FIG. 5. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 5, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. A method, comprising:
   receiving, by an augmentation module, a notification that a source application has placed source data conforming to a source data format on a clipboard stored on a computer memory device, wherein the source data comprises structured data and feed data, and wherein the feed data is usable to enable at least some of the source data to be updated, wherein the receiving includes periodically polling the clipboard for a presence of new source data;
   responsive to the receiving, identifying, by the augmentation module, augmented data conforming to an augmented data format and that is associated with the source data, wherein the augmented data format is not supported by the source application but is supported by a destination application that receives the augmented data from the augmentation module; responsive to the identifying the augmented data, adding, by the augmentation module, the augmented data and the feed data to the clipboard stored on the computer memory device; responsive to the adding, providing the augmented data and the feed data to the destination application to enable the destination application to update the structured data after receiving the augmented data; identifying second augmented data associated with the source data and conforming to a second augmented data format, wherein the second augmented data format is different from the augmented data format; and adding the second augmented data to the clipboard, wherein the source application, the augmentation module, and the destination application are different applications.

2. The method of claim 1, wherein the identifying the augmented data comprises transforming the source data using a transform specification.

3. The method of claim 2 wherein the transform specification uses Extensible Stylesheet Language Transform.

4. The method of claim 1, wherein the identifying the augmented data comprises generating the augmented data using executable code associated with at least one of the source data format or the augmented data format.

5. The method of claim 1, wherein the source data format comprises:
   a structured data item associated with the structured data and that uses a structured data format;
   a feed data item associated with the feed data; and
   a presentation data item.

6. The method of claim 1, further comprising:
   registering for paste processing; and
   wherein the identifying the augmented data and the adding the augmented data are not performed until a paste operation is initiated.

7. The method of claim 1, wherein the identifying the augmented data and the adding the augmented data are only performed when a registered converter exists for the source data format.

8. The method of claim 1 wherein the source data format comprises a presentation data item that has a presentation data format, the augmented data format is the same as the presentation data format, and the augmented data is retrieved from the presentation data item.

9. A system, comprising:
   a processor; and a memory, the processor operating with the memory to provide: a clipboard; a source application configured to place source data conforming to a source data format on the clipboard, wherein the source data contains: header information with attributes comprising: a source attribute representing a reference to a provider of the source data; and a description attribute representing a human-readable description of the source data; and feed data identifying a feed for updating the source data;
   an augmentation module associated with another application that is different from the source application, the augmentation module configured to:
   register with the clipboard to be called when the source data is added to the clipboard;

receive a notification when the source data has been placed on the clipboard by the source application;

identify augmented data associated with the source data and conforming to an augmented data format;

add the augmented data and the feed data to the clipboard;

identify second augmented data associated with the source data and conforming to a second augmented data format, wherein the second augmented data format is different from the augmented data format; and add the second augmented data to the clipboard, the clipboard being further configured to provide the augmented data and the feed data to a destination application that is different from the source application and the another application.

10. The system of claim 9, the processor further operating with the memory to provide:

a clipboard converter used by the augmentation module and configured to generate the augmented data by converting the source data.

11. The system of claim 9, the processor further operating with the memory to provide:

a data converter configured to perform data conversion processing that is platform-independent; and a clipboard converter used by the augmentation module and configured to generate the augmented data by performing platform-dependent processing and using the data converter.

12. The system of claim 9, the processor further operating with the memory to provide:

the destination application configured to receive the augmented data using a paste operation.

13. The system of claim 9 wherein the augmentation module is configured to transform the source data to the augmented data using a transform specification.

14. The system of claim 9 wherein the augmented data is generated using executable code associated with at least one of the source data format and the augmented data format.

15. One or more computer storage devices containing computer-executable instructions that, when executed by one or more processing devices, perform:

receiving, by an augmentation module, a notification that a source application has placed source data conforming to a source data format on a clipboard, wherein the source data comprises structured data and feed data, and wherein the feed data is usable to enable at least some of the source data to be updated, wherein the receiving includes periodically polling the clipboard for a presence of new source data;

responsive to the receiving, identifying, by the augmentation module, augmented data conforming to an augmented data format and that is associated with the source data, wherein the augmented data format is not supported by the source application but is supported by a destination application that receives the augmented data from the augmentation module;

responsive to the identifying the augmented data, adding, by the augmentation module, the augmented data and the feed data to the clipboard stored on the computer memory device;

responsive to the adding, providing the augmented data and the feed data to the destination application to enable the destination application to update the structured data after receiving the augmented data;

identifying second augmented data associated with the source data and conforming to a second augmented data format, wherein the second augmented data format is different from the augmented data format; and adding the second augmented data to the clipboard, wherein the source application, the augmentation module, and the destination application are different applications.

16. The one or more computer storage devices of claim 15, further comprising computer-executable instructions that, when executed by the one or more processing devices, perform: ordering, on the clipboard, the source data format with respect to the augmented data format, wherein the ordering is based on an amount of data provided by the source data format and another amount of data provided by the augmented data format.

* * * * *